United States Patent [19]

Koleda

[11] Patent Number: 5,134,347
[45] Date of Patent: Jul. 28, 1992

[54] LOW POWER CONSUMPTION WIRELESS DATA TRANSMISSION AND CONTROL SYSTEM

[75] Inventor: Randy K. Koleda, Gansevoort, N.Y.

[73] Assignee: Comfortex Corporation, Cohoes, N.Y.

[21] Appl. No.: 777,059

[22] Filed: Oct. 16, 1991

Related U.S. Application Data

[62] Division of Ser. No. 660,379, Feb. 22, 1991.

[51] Int. Cl.$^5$ .............................................. H02J 13/00
[52] U.S. Cl. ...................................... 318/16; 318/558;
388/933; 307/40; 340/825.570; 340/825.640;
340/825.690
[58] Field of Search ................ 318/16, 558, 656, 671,
318/672; 388/933; 307/31, 35, 38, 40;
340/825.57, 625.63, 825.64, 825.65, 825.69

[56] References Cited

U.S. PATENT DOCUMENTS

| | | | |
|---|---|---|---|
| 4,101,873 | 7/1978 | Anderson et al. | 340/539 |
| 4,385,296 | 5/1983 | Tsubaki et al. | 340/825.72 |
| 4,463,432 | 7/1984 | Carter, II | 364/483 |
| 4,672,375 | 6/1987 | Mochida et al. | 340/825.31 |
| 4,688,036 | 8/1987 | Hirano et al. | 340/825.69 |
| 4,959,786 | 9/1990 | Glowczewski et al. | 364/424.1 |
| 5,003,164 | 3/1991 | Barkan | 235/472 |
| 5,029,183 | 7/1991 | Tymes | 357/1 |
| 5,073,750 | 12/1991 | Coron | 318/587 |

*Primary Examiner*—Bentsu Ro
*Attorney, Agent, or Firm*—Dykema Gossett

[57] ABSTRACT

A low power consumption wireless data transmission and control system 10 is disclosed and in one embodiment, is used to automatically articulate a shade 24 by use of a transmitted command signal 14. The system 10 contains a receiver/detector 18 which is selectively activated for only certain intervals of time thereby allowing substantially all of the previously transmitted signals 14 to be received while reducing the power consumed by the detector 18 during periods in which the signals 14 are absent.

4 Claims, 6 Drawing Sheets

LOW POWER CONSUMPTION WIRELESS DATA TRANSMISSION AND CONTROL SYSTEM

This is a divisional of copending application Ser. No. 07/660,379, filed on Feb. 22, 1991.

BACKGROUND OF THE INVENTION

1. Field of the Invention

This invention relates to a low power consumption wireless data transmission and control system and, more particularly, to a data control system having a stored computer program and which is effective to receive remotely transmitted shade commands and to articulate a shade in response to the received commands while consuming a relatively small amount of electrical power during times at which no commands are transmitted.

2. Discussion

Battery powered devices are used in many applications to control many types of devices or apparatuses, such as shades, in response to remotely transmitted command signals. These signals are of such types as electro-optical, electro-magnetic, and/or sonic frequency signals.

As the use of battery powered devices becomes more widespread, the need exists to reduce the power consumption of such devices so that batteries become more cost effective as a means of avoiding the costs associated with hard wiring modifications to existing buildings. One such field of use is that of battery operated window treatment articulation. By making such devices battery operated, installers of window treatments can avoid the costs, the disruptions, and the repair to buildings associated with retrofit wiring. In order to make the devices capable of operating long periods of time between replacement of batteries, or during periods of power failure of building electrical systems, or to take advantage of intermittent power or low intensity power sources for recharging batteries, the control system must utilize a minimum of power to remain capable of receiving and processing command data.

SUMMARY OF THE INVENTION

It is therefore a primary object of this invention to provide a wireless remote data transmission and control system which consumes less electrical power than many past systems.

It is another object of this invention to provide a wireless remote data transmission and control system which is activated or energized for only discrete intervals of time and which is effective to articulate a shade in response to transmitted command signals.

It is a further object of this invention to provide a remote control system which uses less electrical power than many past systems but yet receives substantially every command which is transmitted to it.

According to the teachings of the present invention, a control system is provided which contains a microprocessor under stored program control. The microprocessor selectively energizes the system at selected intervals of time effective to allow the system to receive a transmitted signal while reducing the power consumed by the system during times in which no transmitted command signals exists. These selected intervals of time are dependent, in part, upon the characteristics of the waveform of the command signal and may be modifiable within the stored program.

Further objects, features and advantages of the invention will become apparent from the consideration of the following description and the appended claims when taken in connection with the accompanying drawings.

BRIEF DESCRIPTION OF THE DRAWINGS

Various advantages of the present invention will become apparent to those skilled in the art by reading the following specification and by reference to the following drawings in which.

DETAILED DESCRIPTION OF THE INVENTION

Figure 1:
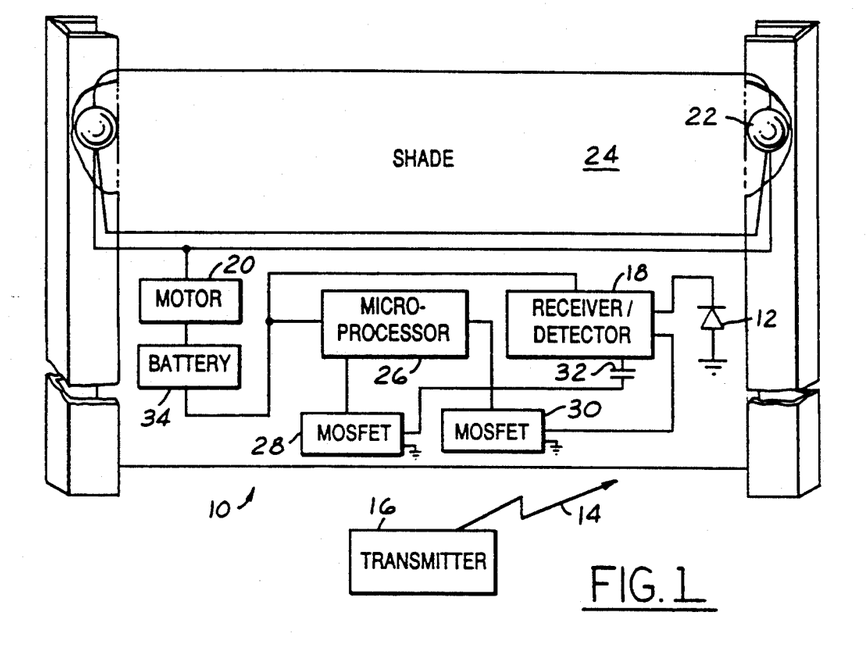
FIG. 1 is a block diagram of a data transmission and control system made in accordance with the teachings of the preferred embodiment of this invention and effective to articulate a shade in response to remotely transmitted command signals.

Referring now to FIG. 1, there is shown data transmission and control system (i.e. "system") 10, made in accordance with the teachings of the preferred embodiment of this invention, and used to selectively articulate shade 24 in response to a received command signal 14. Specifically, system 10 includes a signal reception element 12 which receives the remotely transmitted wireless command signal 14 from a transmitter 16 and which outputs an electrical signal to a receiver/detector 18 in response to this received command. The detector 18 effectively demodulates the command 14 and transmits electrical control signals to the microprocessor 26. These signals are effective to cause microprocessor 26 to activate the motor 20 such that the shade or window covering 24 is moved, by the use of rollers 22, in a manner consistent with or set forth by the received signal 14. Electrical power is provided to the receiver 18 by the battery 34.

Microprocessor 26 is under stored programmed control and is effective to "de-activate" or reduce the amount of electrical power utilized by detector 18 for a predetermined period of time. In the preferred embodiment of this invention, microprocessor 26 comprises a Motorola model MC68HC705C8 microcontroller. The coupling of microprocessor 26 and detector 18 is achieved through the metal oxide semi-conductor Field effect transistors (MOSFETS) 28 and 30. Specifically, MOSFET 28 selectively couples substantially all of the capacitive elements 32 of the detector 18 to electrical ground while MOSFET 30 selectively couples detector 18 to electrical ground. MOSFETS 28 and 30 are selectively activated only upon receipt of appropriate electronic signals from microprocessor 26. Battery 34 also provides electrical power to both motor 20 and to microprocessor 26. In the preferred embodiment of this invention, MOSFETS 28 and 30 each comprise a Harris model RFD14N05L power MOSFETS while detector 18 comprises a NEC model μPC1490HA integrated circuit type processor.

Figure 2:
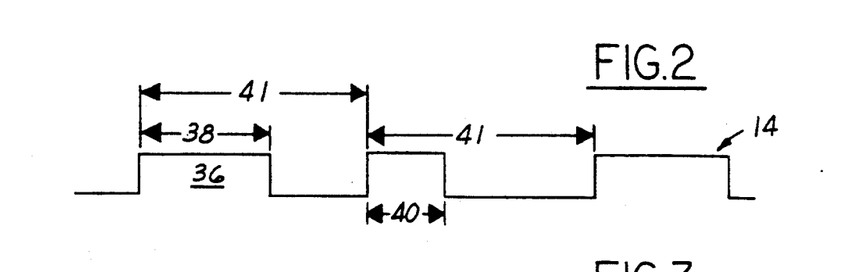
FIG. 2 is an illustration of typical packets of data which are utilized by the system of this invention.
Figure 3:
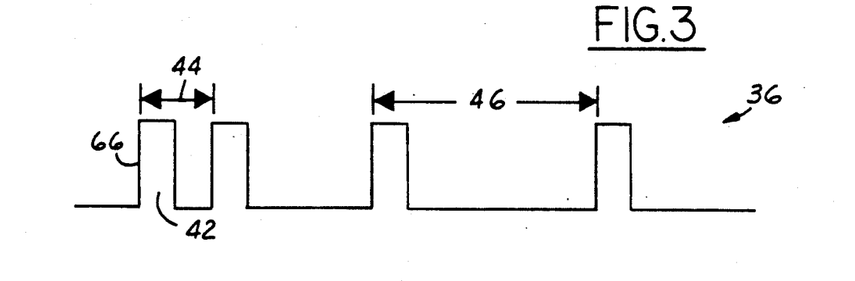
FIG. 3 is an illustration of signals comprising the packets shown in FIG. 2.

As seen best in FIG. 2, command signal 14 is comprised of a series of sequentially positioned packets of data 36. Each data packet 36 has a unique time at which it was transmitted. The total transmission time associated with each of the packets 36 varies from a maximum transmission time 38 to a minimum time 40. Each packet 36 is further made to be transmitted only at equally spaced timing intervals 41. Further, as best seen in FIG. 3, each of the packets 36 contains a series of sequentially transmitted signals 42 each having either a minimum period 44 representing a logical value of zero or a maximum period 46 representing a logical value of one. These characteristics of packets 36 and signals 42 are used by microprocessor 26 to reduce the amount of electrical power utilized by detector 18 during the times in which commands 14 are absent. This reduction is generally achieved by allowing the detector 18 to be energized for only discrete periods of time effective to determine if a packet 36 is really present. To understand the sampling technique associated with the preferred embodiment of this invention, reference is now made to FIG. 5.

The stored program, within microprocessor 26, determines and/or selects the times at which the detector 18 is allowed to be energized. This selection and/or determination is made by causing the microprocessor 26 to undergo a series of operational steps which are illustrated in flow chart 48 of FIG. 5.

Figure 5:
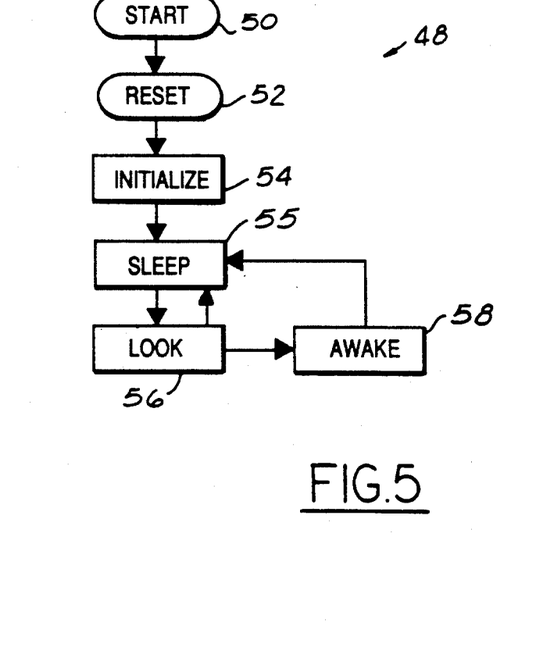
FIG. 5 is a flow chart showing the general sequence of steps associated with the stored program within the system of this invention.

Initially, microprocessor 26 performs a start operation 50 and a reset operation 52 in which all of the variables contained within the microprocessor 26 are made to be a logically known state. Initialization step 54 follows step 52, in which microprocessor 26 prepares for receiver deactivation while ensuring that subsequent settle times are minimized and also determines the address of system 10. Step 54 is then followed by step 55 in which the microprocessor 26 deactivates the detector 18 for a predetermined period of time in order to reduce the amount of electrical power consumed by detector 18. Step 56 follows step 55 in which the microprocessor 26 activates the detector 18 for a predetermined amount of time in order to determine if a command signal 14 has been transmitted. Step 56 is then followed by step 58 or by step 55. That is, if a command signal 14 has been sent, while the microprocessor 26 is in the "Look" step 56, then the microprocessor 26 enters step 58 in which the detector 18 is allowed to decode the received transmitted data packets 36. If a command 14 is not received while the microprocessor 26 is in step 56, then the microprocessor 26 deactivates the detector 18 for a predetermined period of time in accordance with step 55. Steps 55, 56 and 58 are continually traversed by the microprocessor 26 until the stored program is modified or until a system fault occurs.

Figure 6:
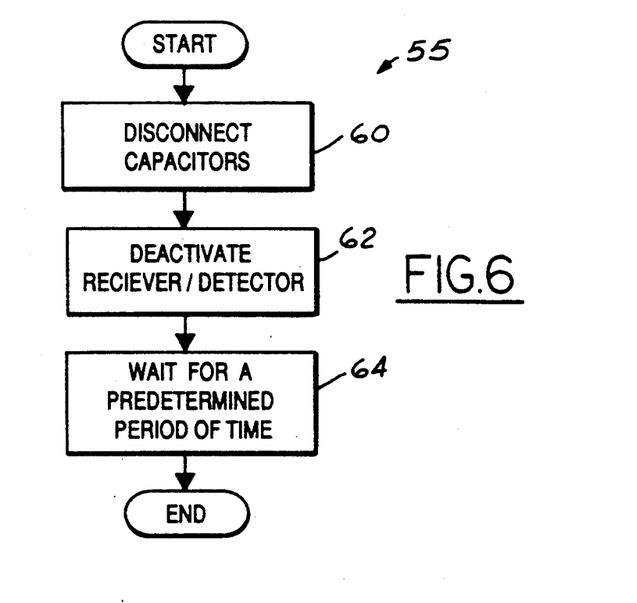
FIG. 6 shows the general sequence of steps comprising the "sleep" step of FIG. 5.

The Sleep step 55, as seen in FIG. 6, comprises a step 60 in which the microprocessor 26 de-energizes MOSFET 28, effective to disconnect capacitive elements 32 from ground. Step 60 is then followed by step 62 in which the microprocessor 26 de-energizes MOSFET 30, effective to disconnect the detector 18 from an electrical ground and thereby preventing the flow of electrical power to the detector 18. By disconnection the capacitive elements 32 before deactivating receiver 18, the electrical charge which is present upon capacitive elements 32 remains substantially stable during the period of time in which the elements 32 are disconnected from electrical ground. Therefore, the settling time (i.e., the time needed to re-charge elements 32) is minimized. Step 62 is then followed by step 64 in which the microprocessor 26 enters a low power wait state for a predetermined period of time. This predetermined period of time, in the preferred embodiment of this invention, is made to be the longest amount of time that the detector 18 may be deactivated while still ensuring that substantially every transmitted command 14, destined for detector 18, is received and recognized. The longer that this time becomes, the more electrical power that is conserved.

The predetermined period of time of step 64 may be calculated by subtracting both the settling time of elements 32 and two of the periods 44 from period 40. In the preferred embodiment of this invention, the predetermined time of step 64 is approximately 18.289 milliseconds. It should be noted that this predetermined amount of time will vary depending upon the number of edges 66, required by the stored program, to be received in order to receive and recognize packet 36. In the preferred embodiment of this invention, three separate edges 66 must be received before the microprocessor 26 determines that a command is present. The use of such edges 66 will be explained in greater detail later. It should however be noted that if more than three edges 66 are needed to verify receipt and recognition of a packet 36 then the predetermined time of step 64 will decrease by an amount equal to the number of required edges multiplied by the time associated with period 46. Consequently, less power is conserved if more edges 66 are used to detect the occurrence of a packet 36.

Figure 7A:
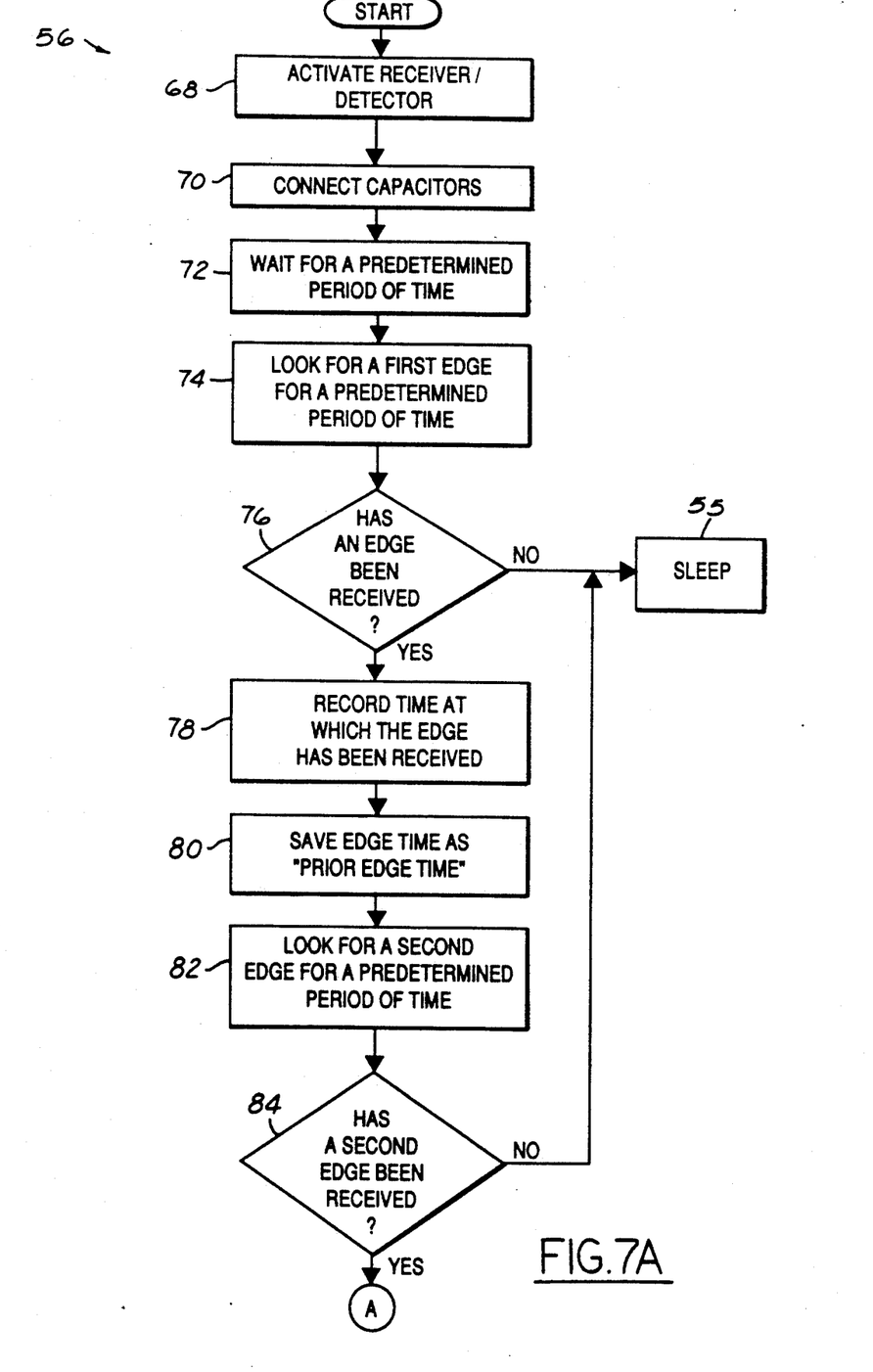
FIGS. 7(a)-(c) shows the sequence of steps comprising the "Look" step of FIG. 5.
Figure 7B:
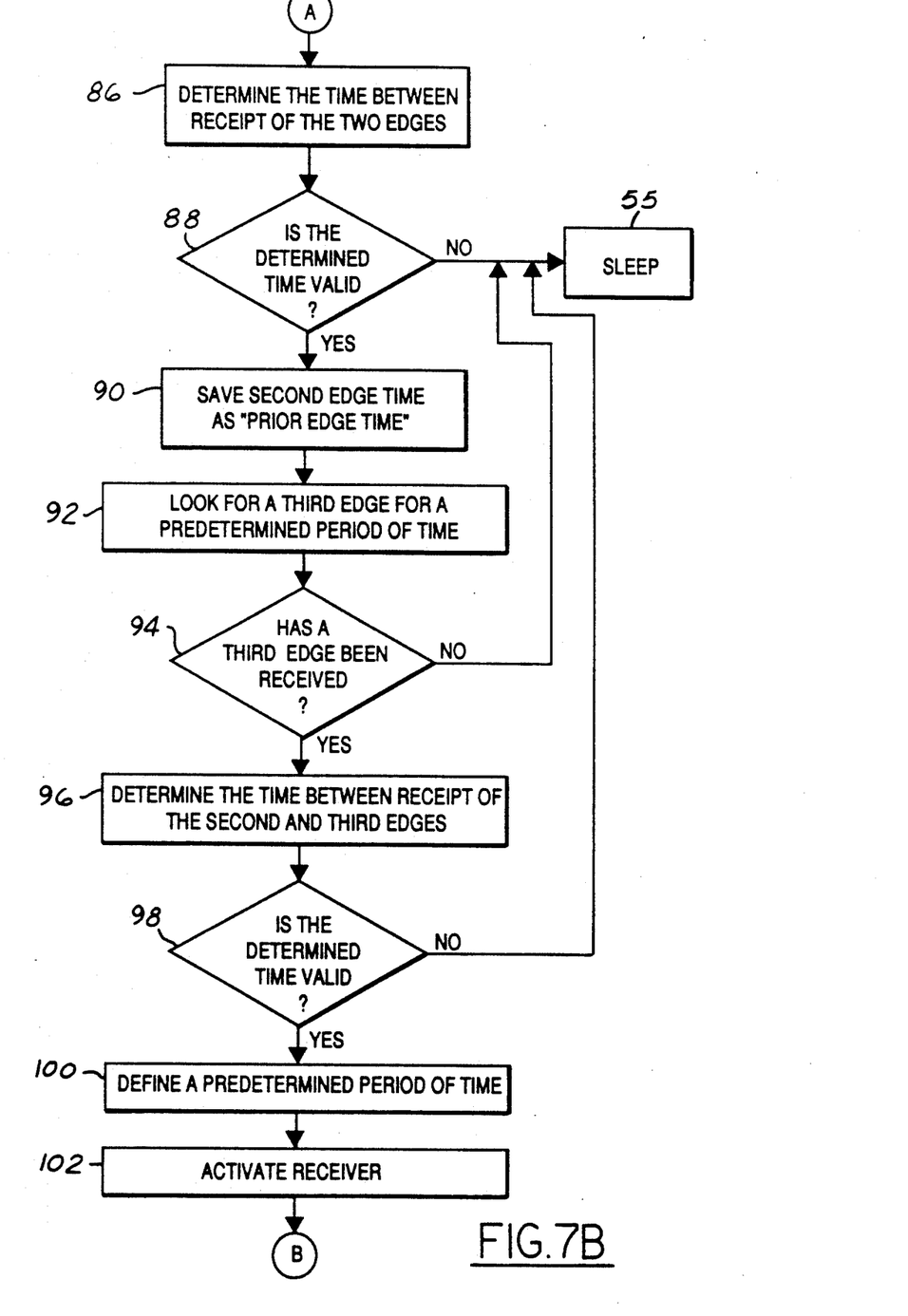
Figure 7C:
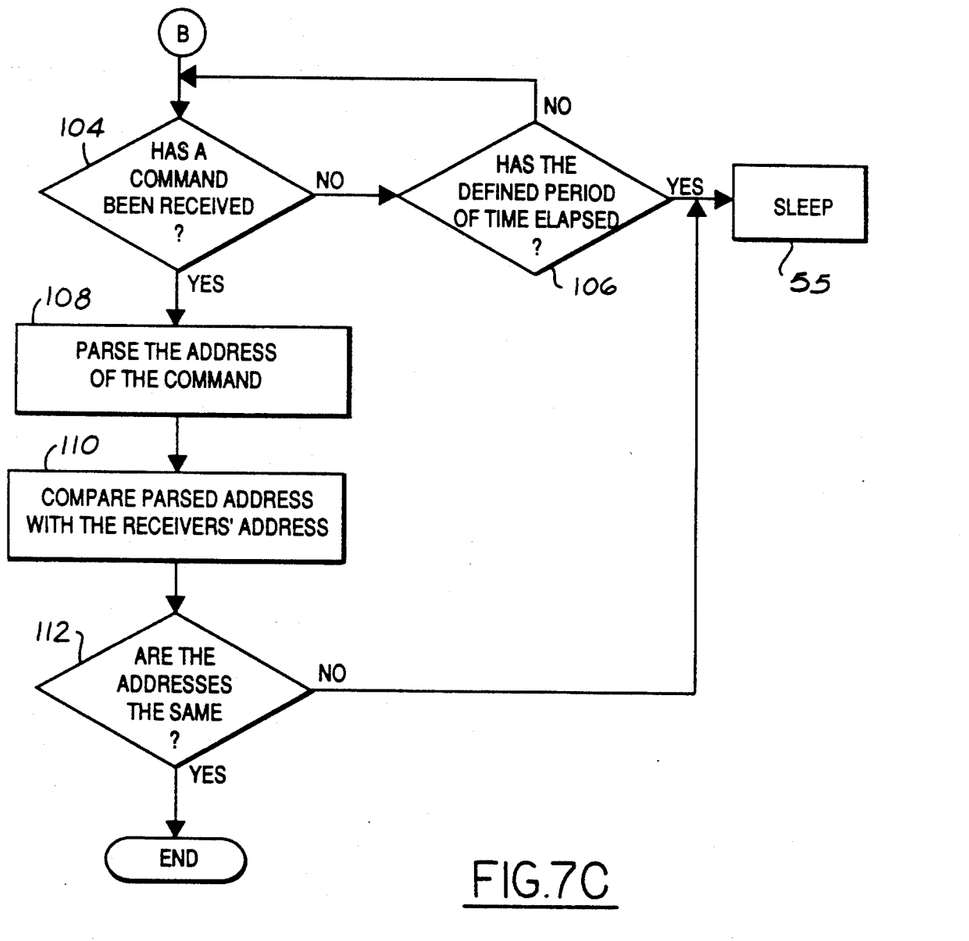

Referring now to FIGS. 7(a)–(c) it is seen that while in the Look step 56, the microprocessor 26 initially enters a step 68 in which the MOSFET 30 is activated, thereby allowing the detector 18 to be re-coupled to electrical ground and also allowing electrical power to be transmitted to the detector 18 by the battery 34. Step 68 is then followed by step 70 in which microprocessor 26 activates the MOSFET 28 thereby allowing the elements 32 to also be re-coupled to electrical ground. Since the elements 32 were previously de-coupled from electrical ground before the detector 18 was deactivated, the electrical charge contained upon these capacitive elements 32 is now still substantially similar to the charge that was present before the capacitive elements 32 were de-coupled from electrical ground. Therefore, only a slight settling time is needed for the elements' charge to stabilize. The settling time in the preferred embodiments of this invention is approximately 0.7 milliseconds. It should be noted that it is best to reconnect the elements 32 only after detector 18 is activated in order to further ensure a reduced settling time.

Step 72 is then followed by step 74 in which the detector 18 is activated (i.e. allowed to sense the occurrence of transmitted signals) and is looking for first edge 66 for a predetermined period of time. This predetermined period of time is made to be substantially equal to period 46. In the preferred embodiment of this invention, this predetermined period of time is actually made to be approximately 10% greater than period 46 in order to allow for the receipt of signals 14 which are be shifted in position by noise. Step 74 is then followed by step 76 in which the microprocessor 26 determines if a first edge 66 had been received during this first predetermined period of time.

Microprocessor 26 enters step 55 if no edge 66 has been received in step 74, while alternatively entering step 78 if one edge 66 has been received during step 74. In step 78 the microprocessor 26 records the time at which this first edge 66 has been received. Step 78 is then followed by step 80 in which the microprocessor 26 saves this edge receipt time and records this as a "prior edge time".

Step 80 is then followed by step 82 in which the microprocessor 26 looks for a second and different edge 66 for a second predetermined period of time. In the preferred embodiment of this invention, this second predetermined period of time is substantially the same as the first predetermined period of time associated with step 74. Step 82 is then followed by step 84 in which the microprocessor 26 determines if a second and different edge 66 has been received during this second predetermined period of time. If, in step 84, the microprocessor 26 determines that this second edge 66 has not been received, then step 84 is followed by step 55. Microprocessor 26 enters step 86 if a second edge 66 has been received during step 84 and, in step 84, records the time at which the second edge was received.

In step 86, the microprocessor 26 determines the time between the receipt of the two edges 66. The validity of this measured time is then determined in step 88 by comparing the elapsed time between the receipt of the two edges 66 with each of the periods 44 and 46. In the preferred embodiment of this invention, the comparison is made by the use of period values which are within approximately 10% of the actual values of periods 44 and 46. Microprocessor 26 enters step 55 if the elapsed time does not substantially equal one of the periods 44 and 46. In step 55 microprocessor 26 deactivates receiver 18 for a period of time since no commands 14 are present. If microprocessor 26 determines that the time between the receipt of the two edges 66 is valid, then step 88 is followed by step 90 in which the microprocessor 26 saves or stores the second edge time as the "prior edge time". Step 90 is then followed by step 92 in which the microprocessor 26 looks for a third and different edge 66 for a third predetermined period of time. In the preferred embodiment of this invention, this third predetermined period of time is substantially equal to the predetermined periods of time associated with steps 82 and 74. Step 92 is then followed by step 94 in which the receiver determines if a third edge 66 has been received during this third predetermined period of time.

If the microprocessor 26 determines, in step 94, that a third edge has not been received, then step 94 is followed by step 55. Microprocessor 26 enters step 96 if a third edge 66 has been received during step 94 and determines the elapsed time between the receipt of the second and third edges 66 while also recording the time at which the third edge has been received. The validity of this elapsed time is determined in step 98 in substantially the same manner as was done in step 88. If the microprocessor 26 determines that this elapsed time is not valid, then microprocessor 26 enters step 55. If this time is valid, microprocessor 26 enters step 100.

In step 100 microprocessor 26 sets forth a predetermined period of time in which the receiver 18 is to be activated in order that it may receive at least two packets of data 36. In the preferred embodiment of this invention, this time is made to be the longest amount of time necessary for receiver 18 to receive two additional packets 36 in addition to the packet 36 containing the three sampled edges 66. In the preferred embodiment of this invention, this predetermined period of time was calculated to be approximately 170 milliseconds. This calculation was made by noting that each of the packets 36 must occur at the start of an interval 41, which in the preferred embodiment of this invention is approximately 67.516 milliseconds. If the three edges 66 used to activate detector 18 occurred at the beginning of a packet 36, a maximum amount of activation time would therefore be required. In this scenario, the receiver 18 would need to be activated for an amount of time equal to substantially two of the intervals 41 in addition to the time associated with a single period 38 (i.e., assuming the second received packet 36 was the longest allowable packet).

Step 100 is then followed by step 102 in which the microprocessor 26 activates the detector 18 for the predetermined period of time as set forth in step 100. Step 102 is then followed by step 104 in which the microprocessor 26 determines if a command 14 has been received during this predetermined period of time. Microprocessor 26, in fact, continually checks to see if this time has elapsed without receipt of a command, as shown in step 106. If a command 14 is not received during this time, microprocessor 26 is made to enter step 55 and deactivates the receiver 18 for a predetermined period of time. Microprocessor 26 enters step 108 if a command is received during step 104 and parses the address of the command 14 before entering step 110. In step 110, the microprocessor 26 compares the parsed command address with the receiver's own address. Step 110 is then followed by step 112 in which the microprocessor 26 determines if the two addresses are the same. If these addresses are not the same, then step 112 is followed 55. If the addresses are the same, then the received command 14 is appropriately decoded in step 58 and the shade 24 is articulated in a manner specified by the received command 14.

Figure 8:
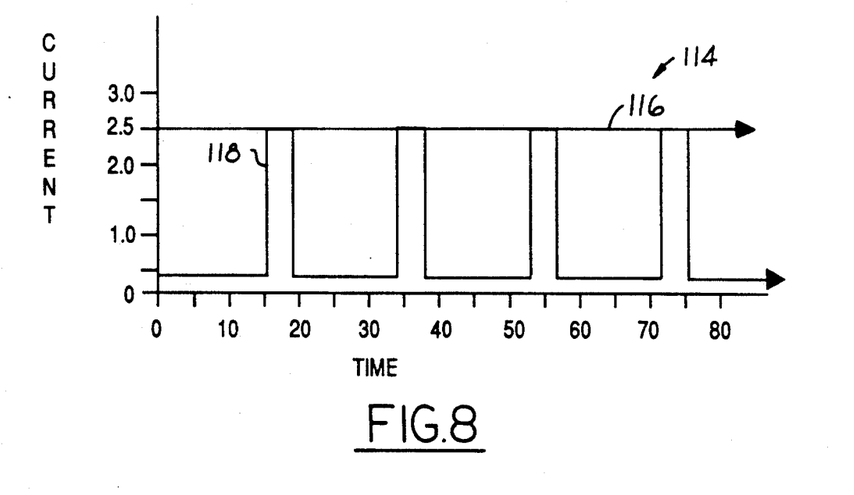
FIG. 8 is a graph showing the power consumed by the system of the preferred embodiment of this invention while in the "Sleep" step and in the "Look" step of FIG. 5.

It should be noted that by the use of these timing intervals of steps 74, 82 and 92, the detector 18 is selectively energized only for predetermined intervals of time and only when there is a high probability that a transmitted packet 36 exists. This selective energization of the receiver 18 allows for the saving of electrical power while ensuring that substantially all transmitted commands 14 are received. Referring now to FIG. 8 there is shown graph 114 illustrating the electrical current used by the system 10 over a representative period of time. Specifically, it can be seen that the current used by the system 10 when the detector 18 is activated is approximately 2.5 milli-amps and that this amperage will be continuously consumed if the detector 18 is continuously activated. If, however, detector 18 is only selectively energized, the power expended is reduced to a level below approximately 0.5 milli-amps and rises only to this relatively high level of 2.5 milli-amps when the detector 18 is actually energized. Therefore, the average power expended by the system 10 of this invention (as shown by curve 118) is substantially lower than that expended by past continuously activated controller, as shown by curve 116.

Figure 4:
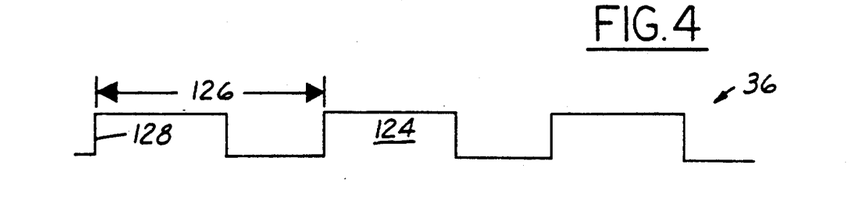
FIG. 4 is an illustration of alternate types of signals which may be used to comprise the packets shown in FIG. 2.
Figure 9:
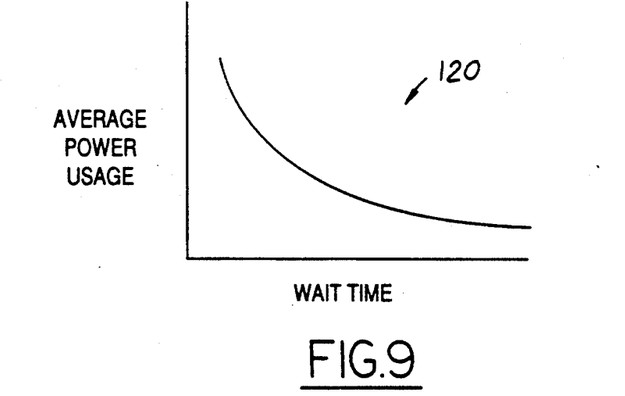
FIG. 9 is a graph showing the relationship between average power usage and the wait time associated with the system of the preferred embodiment of this invention.
Figure 10:
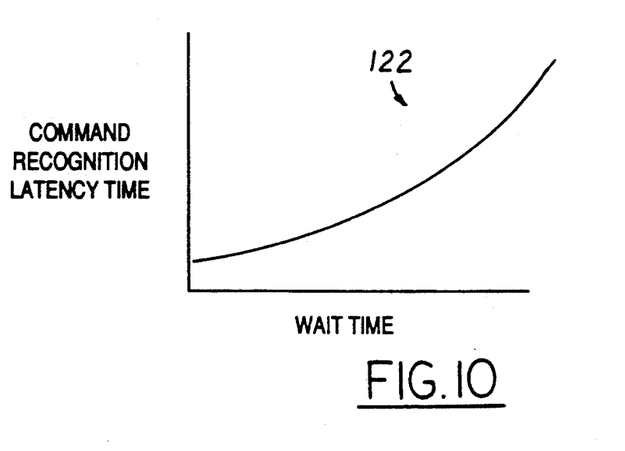
FIG. 10 is a graph showing the relationship between command recognition latency time and wait time associated with the data transmission and control system made in accordance with the teachings of the preferred embodiment of this invention.

Furthermore, this average power usage, as shown in graph 120 of FIG. 9, may be further decreased with a concomitant increase in wait time. That is, the longer that the microprocessor 26 allows the detector 18 to become deactivated (or in a "wait" state), the lower will be the average power usage. However, as shown in curve 122 of FIG. 10, an increase in wait time will cause the detector 18 to lose or to not receive some of this transmitted command signals 14. Therefore, there will be a concomitant increase in command recognition latency time as the wait time is increased. This trade off between average power usage and latency time may be adjusted to any of an infinite number of conditions by appropriately modifying the software contained in the microprocessor 26. Furthermore, the system 10 of this invention may also be employed with packets 36 comprised of a single signal 124, as best shown in FIG. 4. Since each signal has only a single period 126, the microprocessor 26 may be made to simply look for the receipt of a single edge 128 and then, upon receipt of this single edge, cause the detector 18 to be activated for a period of time substantially equal to double the period 126.

It is to be understood that the invention is not limited to the exact construction or method illustrated and described above, but that various changes and modifications may be made without departing from the spirit and scope of the invention as defined in the following claims and that while system 10 has been shown controlling a shade 24, it may be employed in a plethora of other applications requiring the control of many different types of apparatuses.

I claim:

1. A control device for receiving a plurality of sequentially timed signals and for actuating a window shade in response to said received timed signals, wherein the time between any two of said timed signals is constrained to assume only one of several possible values, said control device comprising:

movement means, having an input and an output which is coupled to said shade, for actuating said shade;

receiver means having an input coupled to receive said plurality of sequentially timed signals and an output coupled to the input of said movement means, said receiver means causing said movement means to actuate said shade in response to the received plurality of timed signals;

electrical power means for providing electrical power to said receiver means; and sampling means for connecting said electrical power means to said receiver means only at pre-selected intervals of time for allowing said receiver means to receive said plurality of sequentially timed signals, said sampling means continuing said connection at a further time period only when said plurality of sequentially timed signals are received said sampling means disconnecting said connection to reduce the electrical power consumed by said receiver means during a time in which said plurality of sequentially timed signals are absent.

2. The control device of claim 1 wherein said receiver means contains at least one capacitive element which is normally coupled to electrical ground, said control device further comprising:

capacitive means, coupled to said at least one capacitive element, for disconnecting said at least one capacitive element from the electrical ground before said electrical power means is disconnected from said receiver means and for connecting said at least one capacitive element to the electrical ground after said electrical power means is connected to said receiver means, thereby reducing the settling time of said capacitive element.

3. The control device of claim 1 wherein said preselected intervals of time are related to the largest of said several possible values.

4. A control device for positioning a shade in a manner specified by a packet of data, said packet of data being formed by several sequentially timed signals, wherein the time between any two adjacent timed signals is made to assume only one of two possible values and wherein said packet of data is made to have a total transmission time which is made to vary between a maximum and a minimum value, said control device comprising:

receiving means for receiving said sequentially timed signals of said packet of data and for positioning said shade in a manner specified by said packet of data;

power means for providing electrical power to said receiving means; and sampling means, coupled to said receiving means and to said power means, for preventing substantially all electrical power from being input to said receiving means for a first predetermined period of time, said first predetermined period of time being less than said minimum value, and for applying electrical power to said receiving means for a second predetermined period of time, said second predetermined period of time being slightly greater than the larger value of said two possible values and for determining if a first signal has been received during said second predetermined period of time and for continuing to apply said electrical power to said receiving means for a third predetermined period of time only if one of said sequentially timed signals has been received during said second predetermined period of time and for determining if a second one of said sequentially timed signals has been received during said third predetermined period of time and for determining an amount of elapsed time between receipt of said first and said second signals and for comparing said amount of elapsed time with each of said two possible values and for continuing to apply said electrical power to said receiving means effective to allow said receiving means to receive said packet of data only if said amount of elapsed time substantially equals one of said two possible values, thereby allowing said receiving means to receive said packet of data while reducing the amount of electrical power consumed by said control device when said packet of data is absent.

* * * * *